United States Patent
Baysah et al.

(10) Patent No.: US 10,268,615 B2
(45) Date of Patent: Apr. 23, 2019

(54) DETERMINING TIMEOUT VALUES FOR COMPUTING SYSTEMS

(71) Applicant: International Business Machines Corporation, Armonk, NY (US)

(72) Inventors: Irving G. Baysah, Pflugerville, TX (US); Edgar R. Cordero, Round Rock, TX (US); Marc A. Gollub, Pflugerville, TX (US); Lucus W. Mulkey, Austin, TX (US); Anuwat Saetow, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 52 days.

(21) Appl. No.: 15/683,347

(22) Filed: Aug. 22, 2017

(65) Prior Publication Data

US 2019/0065421 A1    Feb. 28, 2019

(51) Int. Cl.
*G06F 13/38* (2006.01)

(52) U.S. Cl.
CPC ...... *G06F 13/38* (2013.01); *G06F 2213/0002* (2013.01); *G06F 2213/0026* (2013.01)

(58) Field of Classification Search
None
See application file for complete search history.

(56) References Cited

U.S. PATENT DOCUMENTS

| | | | | |
|---|---|---|---|---|
| 5,561,825 A | * | 10/1996 | Yamagami | G06F 3/0601 710/58 |
| 6,526,433 B1 | | 2/2003 | Chang et al. | |
| 7,120,169 B2 | * | 10/2006 | Wolf | H04J 3/0632 370/503 |
| 7,330,051 B1 | * | 2/2008 | Huang | H03K 19/17744 326/38 |
| 7,408,873 B2 | * | 8/2008 | Geile | G06F 17/14 370/208 |
| 8,219,026 B2 | | 7/2012 | Naik et al. | |
| 8,611,332 B2 | * | 12/2013 | Tomita | H04L 12/189 370/324 |
| 9,229,839 B2 | | 1/2016 | Singh et al. | |

(Continued)

FOREIGN PATENT DOCUMENTS

| CN | 103116557 A | 5/2013 |
|---|---|---|
| CN | 104378844 A | 2/2015 |

OTHER PUBLICATIONS

Alharbi, A., Al-Dhalaan, A., & Al-Rodhaan, M. (2015). A Q-Routing Protocol Using Self-Aware Approach for Mobile Ad hoc Networks. American Journal of Applied Sciences, 12(12), 1014.

(Continued)

*Primary Examiner* — Elias Mamo
(74) *Attorney, Agent, or Firm* — Patterson + Sheridan, LLP

(57) ABSTRACT

A Local Timer Engine (LTE) is disclosed. For an initiator in a computing system, the LTE measures a respective time delay for each of a plurality of routes between the initiator and a plurality of destinations. For each of the plurality of routes, the LTE determines a respective timeout value based on the measured respective time delay for the route and determines a unique memory mapped address identifying the route. The initiator sends a request to the LTE for a timeout value. The LTE determines a proper timeout value and provides the proper timeout value to the initiator.

20 Claims, 6 Drawing Sheets

(56) References Cited

U.S. PATENT DOCUMENTS

| | | | |
|---|---|---|---|
| 2008/0279189 A1* | 11/2008 | Smith | H04L 47/564 370/394 |
| 2010/0315998 A1* | 12/2010 | Tomita | H04L 12/189 370/328 |
| 2013/0086274 A1 | 4/2013 | Goswami et al. | |
| 2015/0100617 A1* | 4/2015 | Diederich | H04L 67/1097 709/201 |
| 2016/0084666 A1* | 3/2016 | Dzyuba | G01C 21/3407 701/414 |
| 2016/0246749 A1* | 8/2016 | Kobashi | G06F 13/4022 |

OTHER PUBLICATIONS

Eggert, L. (2009). TCP User Timeout Option (RFC5482). IPCOM000180780D.

\* cited by examiner

| ROUTE 201 | TIMEOUT VALUE 202 | MEMORY ADDRESS RANGE 203 | DESTINATION 204 |
|---|---|---|---|
| 1 | 16 | N/A | NODE 101  L3 110 |
| 2 | 128 | 0 = > (32GB - 1B) | NODE 101  MC 103 |
| 3 | 512 | 1TB = > (1TB + 16MB) | NODE 101  PCIe 105 |
| 4 | 640 | 96GB = > (128GB - 1B) | NODE 121  MC 124 |
| 5 | 1024 | 2TB = > (2TB + 16MB) | NODE 121  PCIe 125 |

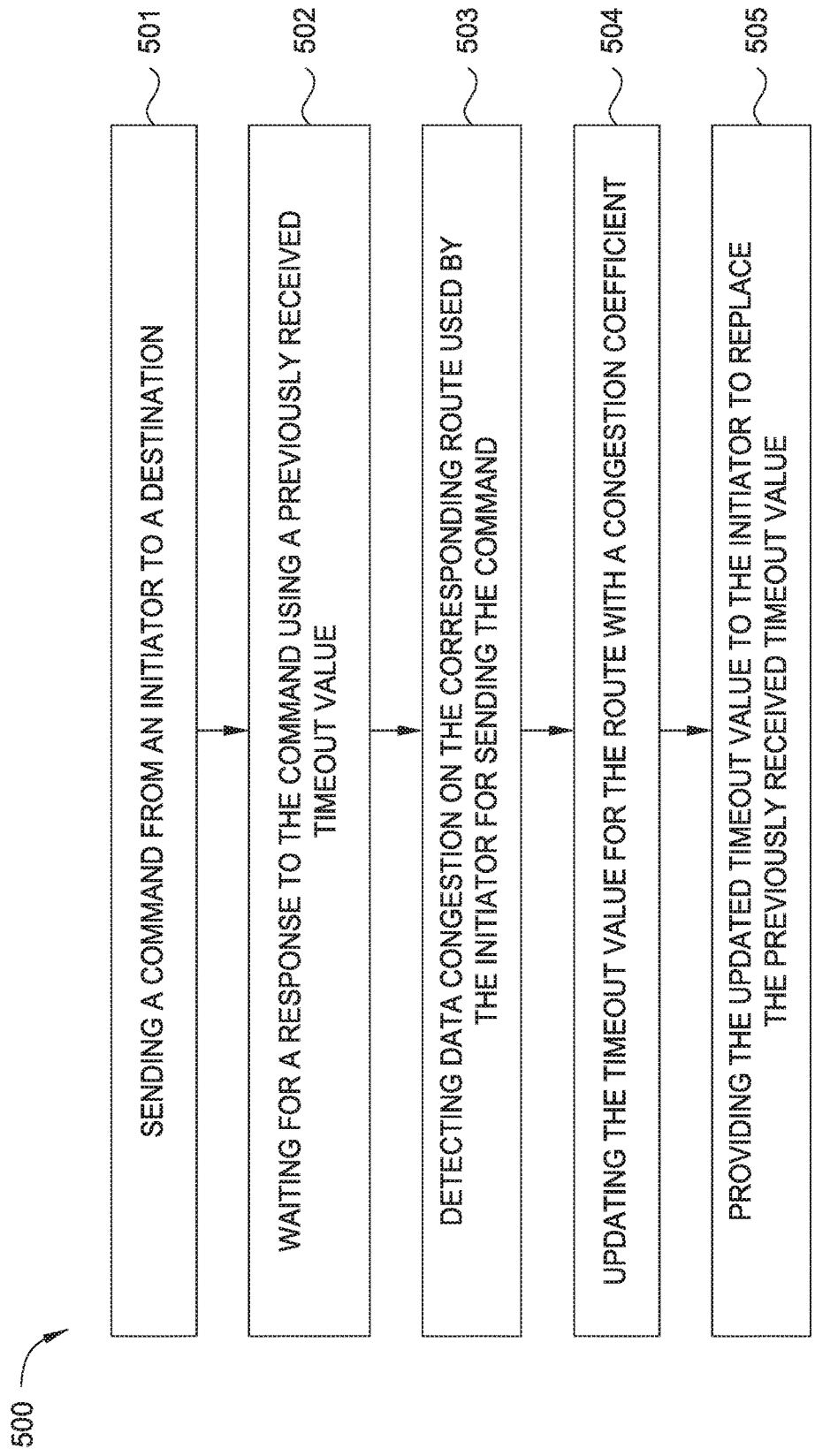

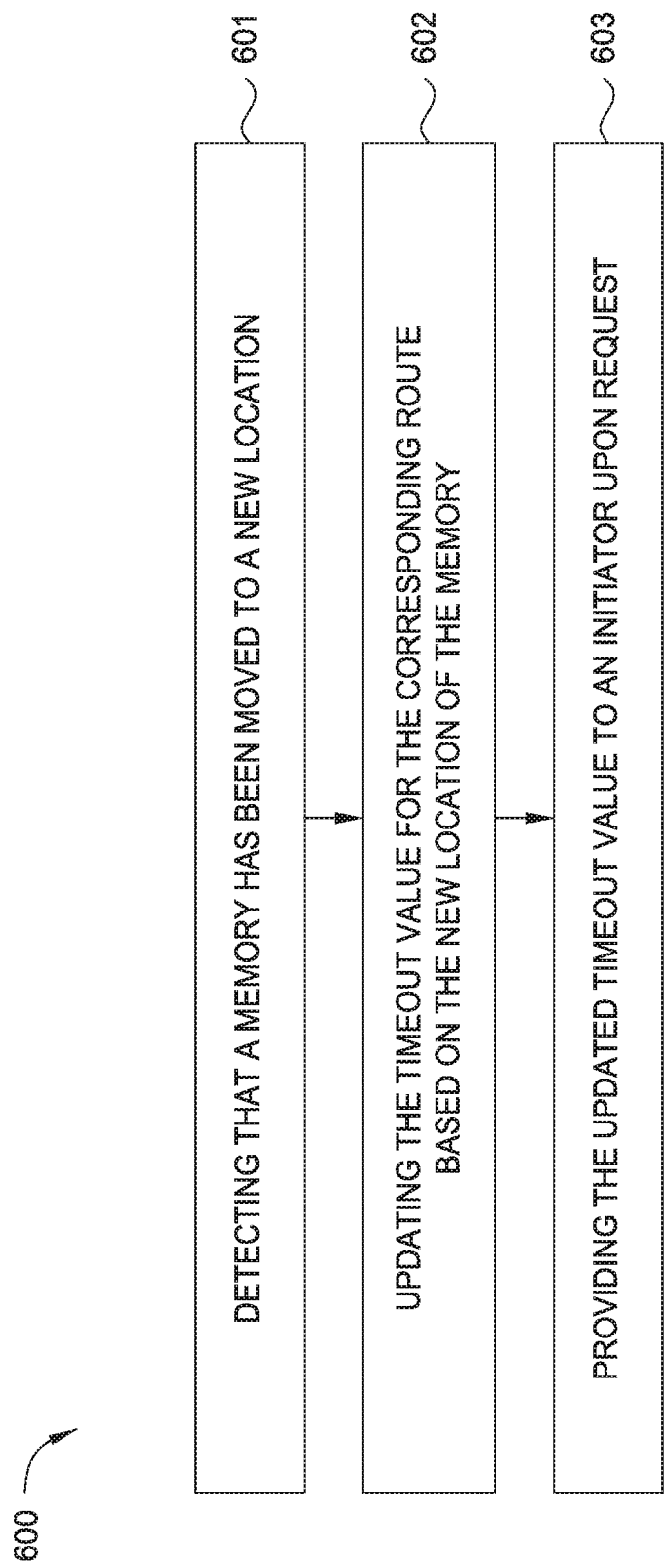

DETERMINING TIMEOUT VALUES FOR COMPUTING SYSTEMS

BACKGROUND

In computing systems, an initiator (or requester) sends a command to a destination (or receiver) to perform an operation. For example, a processor (i.e., the initiator) may send a read command to a memory device (i.e., the destination) to read data from the memory device. The initiator expects a response to the command from the destination within a time period indicated by a timeout value. If the initiator does not receive the response from the destination within the time period, the initiator times out the operation. That is, the timeout value establishes a waiting period before the operation times out. In some situations, a timeout can cause the computing system to hang which may cause the system to crash.

SUMMARY

One embodiment of the present disclosure provides an integrated circuit. The integrated circuit includes an initiator configured to send commands to a plurality of destinations. The integrated circuit also includes a timer engine. The time engine is configured to, for the initiator, measure a respective time delay for each of a plurality of routes between the initiator and the plurality of destinations. The respective time delay indicates a time period from when the initiator sends a command to one of the plurality of destinations to when the initiator receives a corresponding response. The timer engine is also configured to, for each of the plurality of routes, determine a respective timeout value based on the measured respective time delay for the route. The timer engine is further configured to, for each of the plurality of routes, determine a unique memory mapped address identifying the route. The initiator is also configured to, upon determining to send a command to one of the plurality of destinations, send a request to the timer engine for a timeout value. The request includes a memory address for an operation. The initiator is further configured to receive the requested timeout value from the timer engine. Moreover, the initiator is configured to, after sending the command to the destination, determine whether a response to the command is received within a time period indicated by the received timeout value.

One embodiment of the present disclosure provides a computing system. The computing system includes an initiator configured to send commands and a plurality of destinations configured to respond to the commands sent by the initiator. The initiator is coupled to the plurality of destinations through one or more buses. The computing system also includes a timer engine. The time engine is configured to, for the initiator, measure a respective time delay for each of a plurality of routes between the initiator and the plurality of destinations. The respective time delay indicates a time period from when the initiator sends a command to one of the plurality of destinations to when the initiator receives a corresponding response. The timer engine is also configured to, for each of the plurality of routes, determine a respective timeout value based on the measured respective time delay for the route. The timer engine is further configured to, for each of the plurality of routes, determine a unique memory address identifying the route. The initiator is also configured to, upon determining to send a command to one of the plurality of destinations, send a request to the timer engine for a timeout value. The request includes a memory mapped address for an operation. The initiator is further configured to receive the requested timeout value from the timer engine. Moreover, the initiator is configured to, after sending the command to the destination, determine whether a response to the command is received within a time period indicated by the received timeout value.

One embodiment of the present disclosure provides a method. The method includes measuring, by a timer engine, a respective time delay for each of a plurality of routes between an initiator and a plurality of destinations. The respective time delay indicates a time period from when the initiator sends a command to one of the plurality of destinations to when the initiator receives a corresponding response. The method also includes, for each of the plurality of routes, determining a respective timeout value based on the measured respective time delay for the route and determining a unique memory mapped address identifying the route. The method further includes, upon determining to send a command to one of the plurality of destinations, sending, by the initiator, a request to the timer engine for a timeout value. The request includes a memory address for an operation. Moreover, the method includes receiving the requested timeout value from the timer engine, and after sending the command to the destination, determining whether a response to the command is received within a time period indicated by the received timeout value.

BRIEF DESCRIPTION OF THE SEVERAL VIEWS OF THE DRAWINGS

FIG. 2 illustrates a timeout value mapper, according to one embodiment herein.

FIG. 5 illustrates a flowchart showing a method for updating timeout values according to one embodiment herein.

FIG. 6 illustrates a flowchart showing a method for updating timeout values according to another embodiment herein.

DETAILED DESCRIPTION

Figure 1:
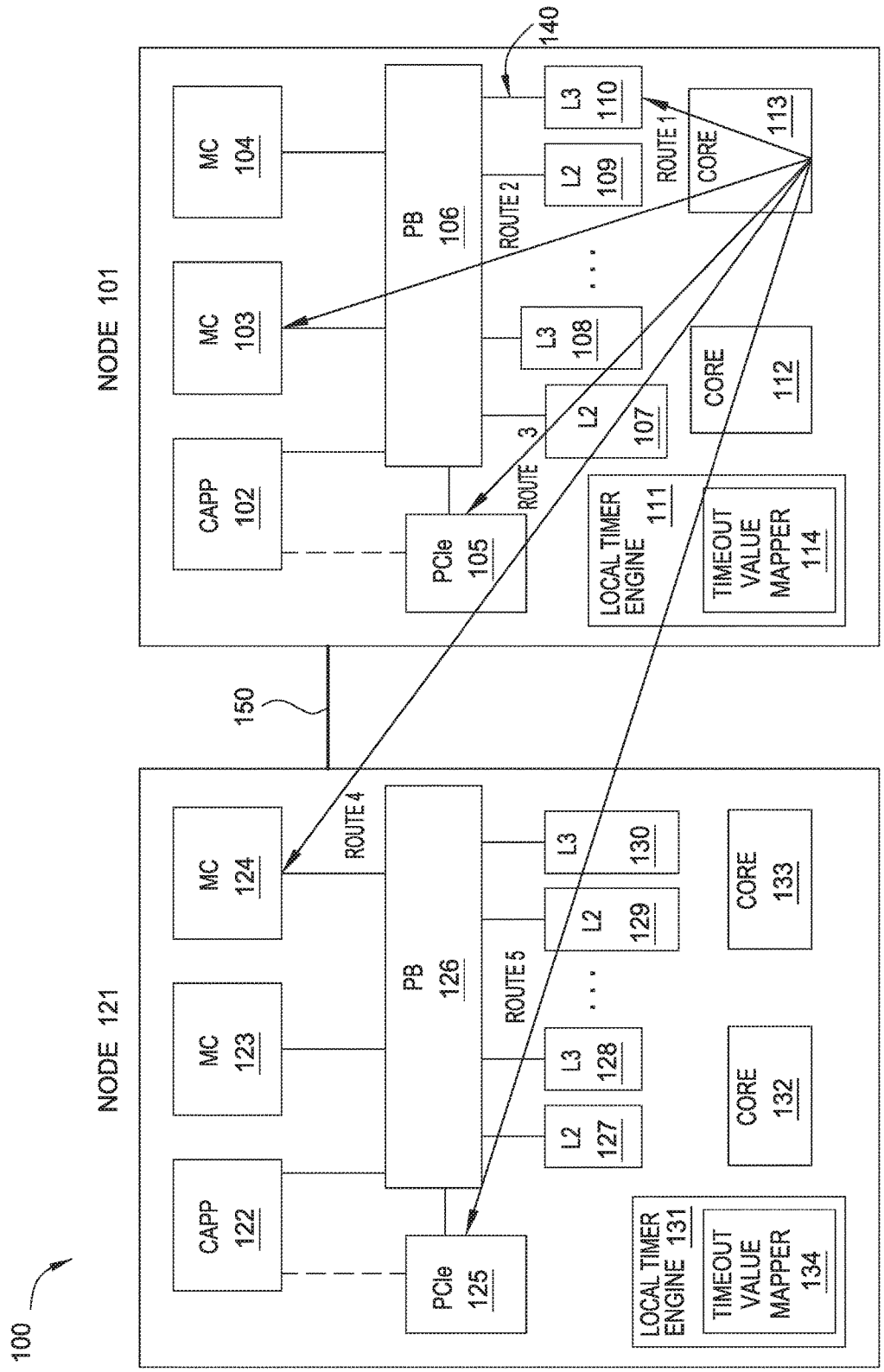
FIG. 1 illustrates a computing system, according to one embodiment herein.

The embodiments herein describe a computing system that uses customized timeout values for different routes between initiators and destinations. In contrast, computing systems that use the same timeout value for all operations do not account for difference between routes such as lengths of the route, chip interfaces, congestion, etc. The time period indicated by the timeout value maybe too short for some operations and too long for other operations. For example, if the time period is too short, the operation may time out too early while in fact the destination is still responding to the command and there is no system hang. An early timeout determination falsely indicates that the system has hung which may cause the user to manually reboot the computing system unnecessarily. In another example, if the time period is too long, the operation may timeout too late when in fact the system hang has happened much earlier. A late timeout determination does not detect the system hang fast enough to provide timely debug information to fix the problem. The present disclosure provides embodiments to dynamically assign different timeout values to the initiator for different operations to avoid early timeout determination and/or late timeout determination.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 illustrates a computing system 100, according to one embodiment herein. In one embodiment, the computing system 100 can be a coherent system including multiple sub-systems. In one embodiment, the computing system 100 includes one or more nodes. For example, as shown in FIG. 1, the computing system 10 includes two nodes, i.e., node 101 and node 111. In one embodiment, the nodes are integrated circuits such as system on chips (SoCs). In one example, the integrated circuits can be located on the same sub-system, e.g., a computer, of the computing system 100. In another example, the integrated circuits can be located on different sub-systems, e.g., different computers, of the computing system 100. It is assumed that in FIG. 1, node 101 and node 121 are two SoCs that are located on two different sub-systems of the computing system 100.

Node 101 includes multiple components. As shown in FIG. 1, node 101 includes a coherent accelerator processor proxy (CAPP) 102, memory controllers (MC) 103 and 104, a Peripheral Component Interconnect Express (PCIE) device 105, and multiple caches such as L2 caches 107 and 109 and L3 caches 108 and 110. Node 101 also includes a Power Bus (PB) 106 such as a High-Speed Serial Interface (HSSI) to connect the above mentioned components. In one embodiment, the PB 106 includes an internal PB that connects different components within a SoC, as shown by 140 in FIG. 1. In another embodiment, the PB 106 includes a high-speed X-bus to connect different chips or SoCs in the same sub-system. Moreover, node 101 includes two processor cores 112 and 113. In the present disclosure, node 101 further includes a Local Timer Engine (LTE) 111. Node 121 includes similar components as node 101. In one embodiment, the PB 126 in node 121 and the PB 106 in node 101 are parts of the same PB for the computing system 100. Node 101 and node 121 are connected via power bus 150 such as a high-speed A-bus. In one embodiment, the power bus 150 is part of the PB of the computing system 100.

In the present disclosure, the LTE 111 assigns different timeout values to an initiator on node 101 for different operations. In this way, depending on the operation, the initiator can determine if the operation has timed out using a customized timeout value. Comparing to using one timeout value for all operations, the initiator can avoid early timeout determinations and/or late timeout determinations.

As shown in FIG. 1, the processor core 113 (an initiator) can send commands to five destinations for different operations. In one example, the initiator is connected to the destinations through one or more buses such as high-speed buses and/or HSSIs. The five destinations are the L3 cache 110, the MC 103 on the node 101, the PCIE device 105 on the node 101, the MC 124 on the node 121, and the PCIE 125 on node 121. The processor core 113 sends commands to the five destinations through five routes, respectively. For example, the processor core 113 can send write commands to the L3 cache 110 through route 1 to write data to the L3 cache 110. In another example, the processor core 113 can send read commands to the MC 124 through route 4 to read data from the MC 124. The LTE 111 determines a proper timeout value for each route and stores the timeout values for the five routes in a timeout mapper 114. When the processor core 113 needs to send a command to a destination through one of the five routes, the LTE 111 checks the timeout mapper 114 and provides the timeout value for the route to the processor core 113.

For example, the LTE 111 can determine a proper timeout value for route 1 and provide the timeout value for route 1 to the processor core 113 when the processor core 113 needs to send a command to the L3 cache 110. As shown in FIG. 1, the L3 cache 110 and the processor core 113 are located on the same node 101 and are close to each other, thus, route 1 is a short route. In one embodiment, by measuring the point-to-point time delay between the L3 cache 110 and the processor core 113, the LTE 111 can determine a short timeout value for route 1.

In another example, the LTE 111 can determine a proper timeout value for route 2 and provide the timeout value for route 2 to the processor core 113 when the processor core 113 needs to send a command to the MC 103. As shown in FIG. 1, although the MC 103 and the processor core 113 are also located on the same node 101, they are further from each other comparing to the distance between the L3 cache 110 and the processor core 113. In one embodiment, by measuring the point-to-point time delay between the MC 103 and the processor core 113, the LTE 111 can determine a longer timeout value for route 2 comparing to the timeout value for route 1.

In another example, the LTE 111 can determine a proper timeout value for route 4 and provide the timeout value for route 4 to the processor core 113 when the processor core 113 needs to send a command to the MC 124. As shown in FIG. 1, the MC 124 and the processor core 113 are located on two different nodes and the two nodes are one two different sub-systems, thus, route 4 is an even longer route comparing to routes 1 or 2. In one embodiment, by measuring the point-to-point time delay between the MC 124 and the processor core 113, the LTE 111 can determine an even longer timeout value for route 4 comparing to the timeout values for routes 1 or 2.

The LTE 131 on node 121 also includes a timeout mapper 134. Similarly as described above, the LTE 131 can also store the timeout values in the timeout mapper 134 and provide proper timeout values to the initiators on node 121, e.g., the processor core 132. Embodiments of determining the timeout values for each route will be described in detail below.

FIG. 1 only shows one embodiment of the computing system 100. In another embodiment, node 121 may include different components from node 101. In another embodiment, node 101 and/or node 121 may include different routes. In another embodiment, the computing system includes a different number of nodes connected with each other through one or more buses. In another embodiment, the nodes are sub-systems, e.g., computers of the computing system 100. In another embodiment, the computing system 100 includes multiple coherent sub-systems connected with each other through one or more buses. In one embodiment, the coherent sub-systems include two or more processors or cores that share a common area of memory, i.e., a coherent memory. For example, the memory in the nodes shown in FIG. 1 such as the caches may be part of a memory space shared by the cores on both of the nodes. In one embodiment, the computing system 100 is coherent with one memory map. The memory map includes the entire memory space of the computing system 100. As the computing system 100 grows to be a larger system, the memory map also grows to ensure that each coherent device/component/unit in the computing system 100 is addressable with a unique address in the memory map.

FIG. 2 illustrates the timeout value mapper 114, according to one embodiment herein. As shown in FIG. 2, the timeout value mapper 114 includes four columns. The first column 201 includes the route number, e.g., route 1-5. The second column 202 includes the timeout value for each route. For example, the timeout value for route 1 is 16 milliseconds.

The third column 203 includes the memory address range for one or more operations on each route. For example, the processor core 113 can send a read command to the MC 103 through route 2 to read data from the MC 103. In order to read data from the MC 103, the processor core 113 needs to access one or more memory addresses within the range of 0 to 32 GB−1. Thus, the memory address range of 0 to 32 GB−1 corresponds to route 2, as shown in FIG. 2. The fourth column 204 includes information of the destinations for each route. For example, the destination on route 1 is the L3 cache 110 on node 101.

In one embodiment, each component that is connected to the PB (e.g., PB 106 and/or PB 126) of the computing system 100 has a unique memory address range in column 203. In one embodiment, the memory address ranges for each component are predefined by the system architects who build the computing system 100. The predefined memory address ranges are programmed into each component that is connected to the PB of the computing system 100. Thus, in one embodiment, there is a one-to-one mapping between a component and a memory address range. For example, the MC 124 is assigned 32 GB of memory, which starts from address location 96 GB and ends at address location (128 GB-1 B) in the memory map of the coherent computing system 100. In this way, when the initiator sends a command via the PB of the computing system 100 to access a memory address range in the memory map, only one destination responds to the command.

In FIG. 2, the timeout value mapper 114 only shows 5 routes for one initiator on node 101, i.e., the processor core 113. As understood by an ordinary person in the art, the timeout value mapper 114 also includes similar information for other initiators on the node 101, e.g., the processor core 112, that send commands to multiple destinations through other routes (not shown in FIG. 2). In another embodiment, the timeout value mapper 114 may also include information of the different initiators on the same SoC or integrated circuit. In another embodiment, the timeout value mapper 114 may also include information of the operations on each route. The timeout value mapper 134 in the LTE 131 is similar as the timeout value mapper 114 but may contain the timeout values for initiators on the node 121.

Before an initiator on node 101 sends a command to perform an operation at a destination, the initiator first sends a request for the corresponding timeout value to the LTE 111. Based on the address information (or destination address) in the request, the LTE 111 parses the timeout value mapper 114 to determine the corresponding timeout value for the operation. Creating the timeout value mapper 114 will be described in detail below.

Figure 3:
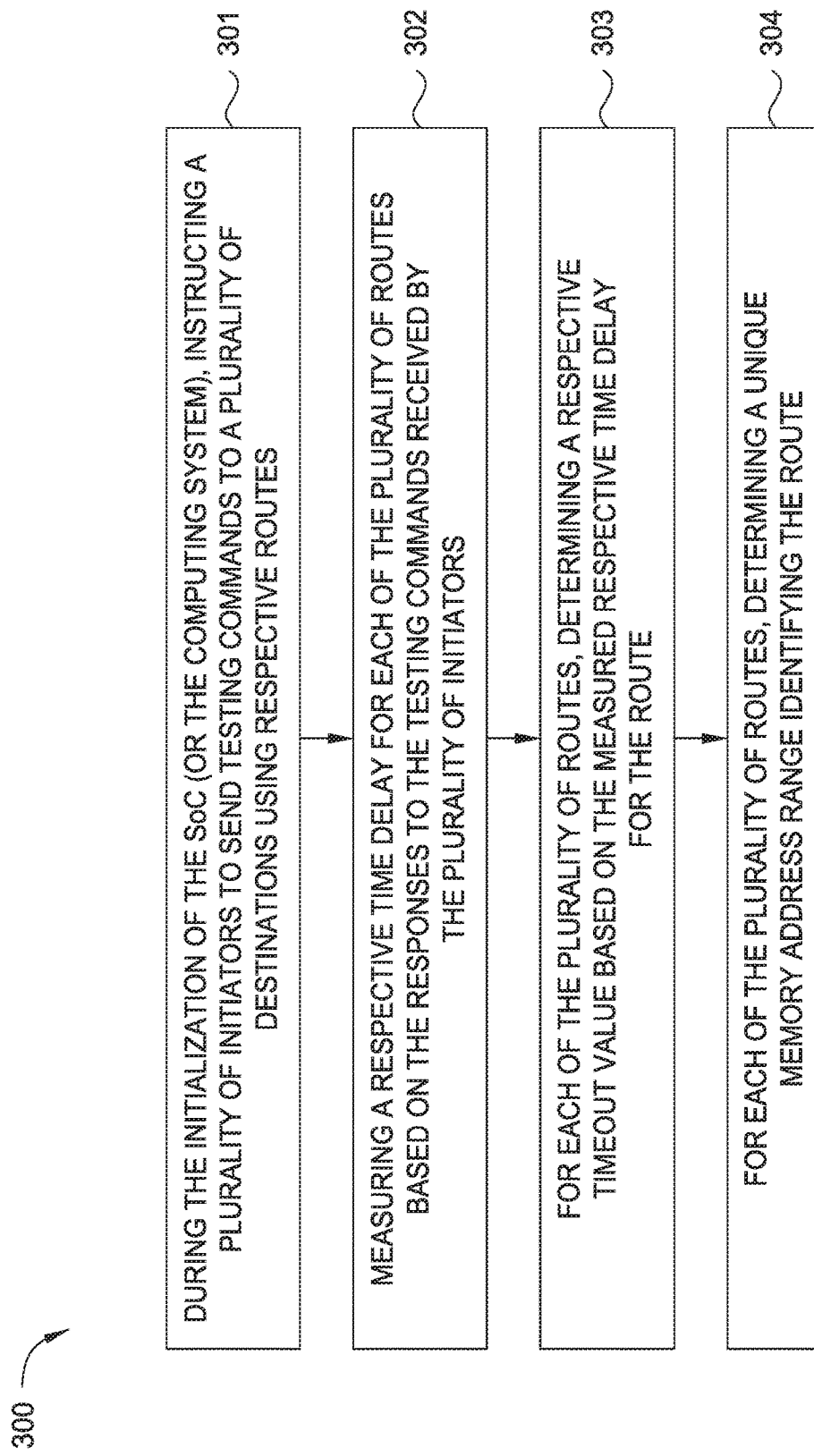
FIG. 3 illustrates a flowchart showing a method for initializing a local timer engine, according to one embodiment herein.

FIG. 3 illustrates a flowchart showing a method 300 for initializing the LTE, according to one embodiment herein. FIG. 3 will be described using FIGS. 1 and 2.

At block 301, during initialization of the SoC (or the computing system), the LTE instructs a plurality of initiators to send testing commands to a plurality of destinations using respective routes. For example, during initialization of the node 101 (or the computing system 100), the LTE 111 can identify all the initiators on node 101 based on vital product data (VPD) stored on node 101. In one embodiment, the LTE 111 can instruct all the initiators on node 101 to send testing commands to a plurality of destinations through respective routes. For example, the LTE 111 may identify a list of potential destinations for the initiators based on the particular architecture in the SoC. For example, the LTE 111 may identify the components that are communicatively coupled to an initiator either in the chip or to another chip and determine which of these components the initiator may send a command to during operation.

In one embodiment, at block 301, the LTE 111 does not instruct all the initiators on node 101 to send testing commands to all the possible destinations. Instead, the LTE 111 instructs some (but not all) initiators on node 101 to send testing commands to some (but not all) destinations using representative routes. For Example, the LTE 111 can instruct the processor core 103 to send a testing command, e.g., a dummy command, to the MC 103 through route 2, as shown in FIG. 1. Route 2 can represent a group of routes between the processor core 103 and the MCs, e.g., MC 102 and MC 103, on node 101. Because the MCs on node 101 have similar distances to the processor core 103, the representative route (route 2 in this example) can represent the group of routes between the processor core 103 and the MCs on node 101. Also, because the processor core 102 and the processor core 103 have similar functions and similar locations, route 2 can also represent a group of routes between the processor core 102 and the MCs on node 101. In this way, the LTE 111 does not need to instruct every initiator on node 101 to send testing commands to every possible destination. It is assumed that the five routes in FIG. 1 are representative routes.

At block 302, the LTE measures a respective time delay for each of the plurality of routes based on the responses to the testing commands received by the plurality of initiators. For example, the LTE 111 measures the point-to-point delay between the processor core 103 and each of the five destinations, as shown in FIG. 1. In one embodiment, the point-to-point delay between an initiator and a destination is the time period from when the initiator sends a testing command to the destination through a route to when the initiator receives a corresponding response from the destination through the route. For example, the point-to-point delay between the processor core 103 and the MC 103 is the time period from when the processor core 103 sends a testing command, e.g., a dummy command, to the MC 103 through route 2 to when the processor core 103 receives a response, e.g., an acknowledgement (ACK) or negative acknowledgement (NACK) to the dummy command, from the MC 103 through route 2.

In one embodiment, at block 302, the initiator provides to the LTE the time information of when the initiator sends a testing command and when the initiator receives a corresponding response for each representative route and the LTE measures the time delays for each representative route. In one embodiment, the initiator measures the point-to-point delays for each representative route and provides the point-to-point delays to the LTE. In one embodiment, the LTE stores the measured point-to-point delays for each representative route between an initiator and a destination in the timeout value mapper of the LTE.

At block 303, for each of the plurality of routes, the LTE determines a respective timeout value based on the measured respective point-to-point time delay for the route. For example, the LTE 111 measures that the point-to-point delay between the processor core 103 and the MC 103 is 100 milliseconds, then the LTE 111 can determine that the timeout value for route 2 should be a value larger than 100 milliseconds but should not be in the range of multiple seconds. In one embodiment, the timeout value can range from nanoseconds to seconds. The LTE 111 can determine that the proper timeout value is in the same range as the measured point-to-point delay. For example, the proper timeout value and the point-to-point delay are both in the range of 100-300 milliseconds or both in the range of 1-10 seconds. A timeout value in a higher range is considered as too large for a point-to-point delay in a lower range. For example, a timeout value of 5 seconds is too large for a point-to-point delay of 100 milliseconds.

At block 303, the LTE 111 can determine a proper timeout value, e.g., 128 milliseconds, for route 2. In one embodiment, the LTE 111 stores the timeout value, i.e., 128 milliseconds, for route 2 in the timeout value mapper 114, as shown in FIG. 2. As shown in FIG. 2, the LTE 111 stores the timeout values for each representative route (e.g., route 1-5 in FIG. 1) in the timeout value mapper 114 at column 202. In one embodiment, all the routes represented by a representative route share the same timeout value—e.g., all the routes between a processor core and a L3 cache.

At block 304, for each of the plurality of routes, the LTE determines a unique memory address range identifying the route. In one embodiment, the unique memory address range is a memory address range in a memory map of the coherent computing system 100. For example, the processor core 113 can send a read command to the MC 103 through route 2 to read data from the MC 103. In order to read data from the MC 103, the processor core 113 needs to access one or more memory addresses within the range of 0 to 32 GB−1. In other words, when the processor core 113 needs to access one or more memory addresses within the range of 0 to 32 GB−1, it indicates that the processor core 113 uses route 2 to send a read command to the MC 103. Thus, the memory address range of 0 to 32 GB−1 uniquely identifies route 2. In one embodiment, the LTE determines a respective unique memory address range identifying each route by using information provided by the hypervisor or the memory managing software of the computing system 100. For example, the hypervisor or the memory managing software of the computing system 100 can inform the LTE 111 that for a read operation using route 2, the processor core 113 needs to access one or more memory addresses within the range of 0 to 32 GB−1. The LTE 111 can store the memory address range of 0 to 32 GB−1 for route 2 in the timeout value mapper 114. In FIG. 2, the LTE stores the unique memory address range identifying each representative route (e.g., route 1-5 in FIG. 1) in the timeout value mapper 114 in column 203. In one embodiment, the address range indicates the memory addresses corresponding to a representative route. For example, route 2 may represent the group of routes between all the processor cores, e.g., the processor cores 102 and 103, on node 101 and all the MCs, e.g., the MCs 103 and 104 on node 101. When any one of the processor cores on node 101 sends a command to any one of the MCs on node 101, the processor core needs to access the memory addresses within the range of 0 to 32 GB−1, and thus, is assigned the timeout value 128 milliseconds for route 2 as shown in FIG. 2.

After the LTE 111 implements the method 300, the LTE 111 is initialized and the timeout value mapper 114 is created which the LTE 111 can use to provide timeout values to the initiators on node 101 during normal operation.

Figure 4:
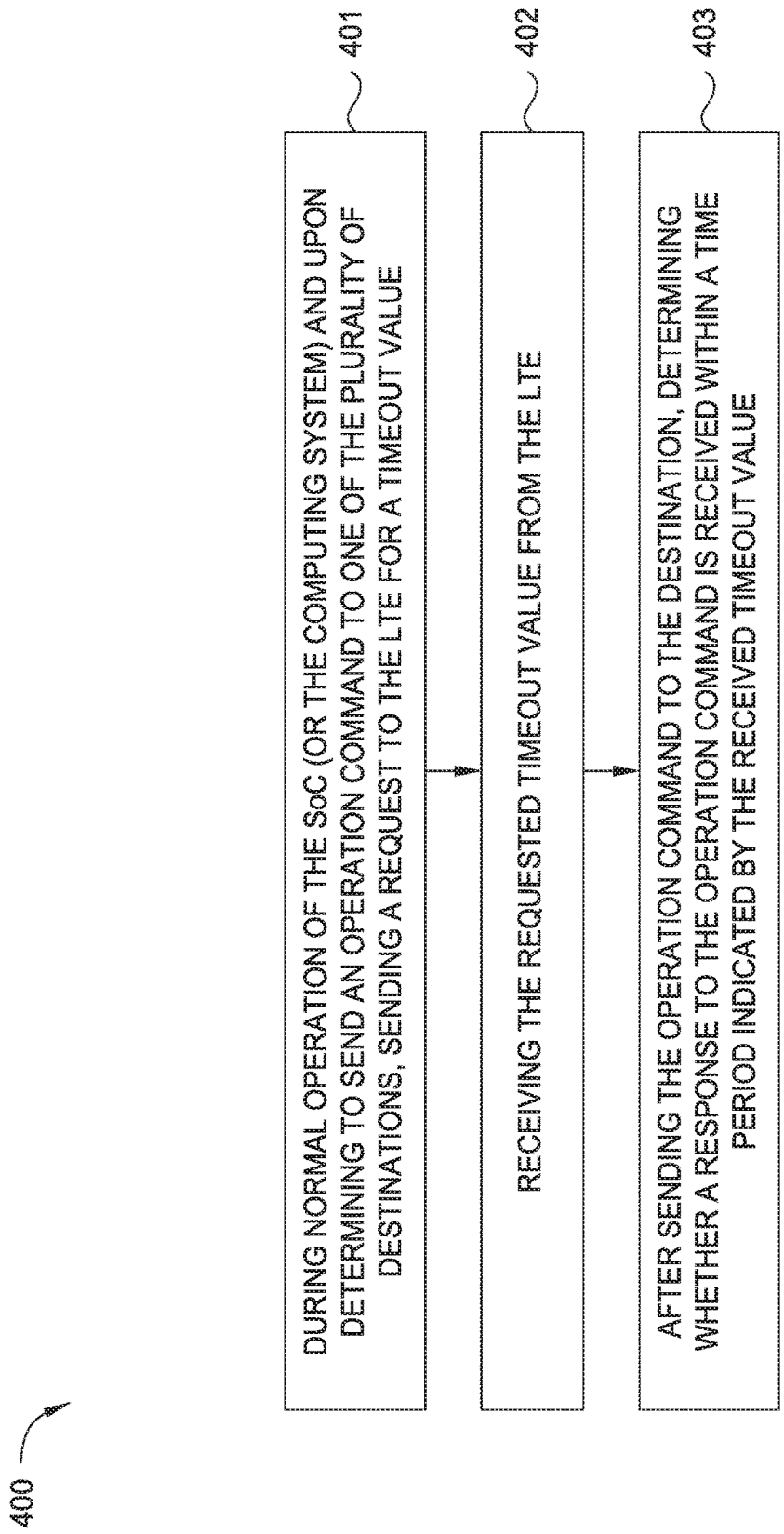
FIG. 4 illustrates a flowchart showing a method for requesting a timeout value from the local timer engine, according to one embodiment herein.

FIG. 4 illustrates a flowchart showing a method 400 for requesting a timeout value from the local timer engine, according to one embodiment herein. FIG. 4 will be described using FIGS. 1 and 2.

At block 401, during normal operation of the SoC (or the computing system) and upon determining to send an operation command to one of the plurality of destinations, an initiator sends a request to the LTE for a timeout value. For example, after the computing system 100 is initialized, the computing system 100 (including node 101 and node 121) starts the normal operation during which the processor core 103 determines to send a read command (an operation command that is different from the testing command used in initialization) to the MC 124 as shown in FIG. 1. However, before sending the read command to the MC 124, the processor core 103 sends a request to the LTE 111 for a timeout value. In other embodiments, the initiator only needs to receive the timeout value before the timeout value expires. For example, the initiator may send the request to the LTE 111 after sending the operation command to the destination. In another example, the initiator may send the request to the LTE 111 simultaneously when sending the operation command to the destination.

In one embodiment, the request for a timeout value includes a memory address range for the operation. For example, the processor core 103 has the knowledge from the node 101 (or the computing system 100) the memory address associated with the read request (although the processor core 103 may not know the actual component or destination that has the requested memory). Thus, the processor core 113 sends a request to the LTE 111, which indicates that the processor core 113 needs to access memory addresses corresponding to the MC 124 for the read operation and needs the corresponding timeout value. Using memory address ranges to request the timeout value for a particular operation is only one embodiment. In other embodiments, the request can include other unique identification information to request the timeout value. For example, the request for a timeout value can include an identifier of the destination. For example, the processor core 103 may know the destination from the node 101 (or the computing system 100) and can send a request including an identifier of the destination, e.g., a bus address.

Upon receiving the request from the processor core 113, the LTE 111 determines the route that will be used by the processor core 113 to send the read command to the MC 124 using the memory address range for the operation in the received request. For example, the LTE 111 checks the timeout value mapper 114 to determine the route for the read operation. By checking the timeout value mapper 114, the LTE 111 determines, for example, that the received memory addresses is within the memory address range of 96 GB to 128 GB−1 in column 203 of the timeout value mapper 114 as shown in FIG. 2. Thus, the LTE 111 determines that the processor core 113 will use route 4 to send the read command to the MC 124. Accordingly, the LTE 111 determines that the proper timeout value for the read operation is 640 milliseconds. At block 402, the processor core 113 receives the requested timeout value from the LTE 111.

At block 403, after sending the operation command to the destination, the initiator determines whether a response to the operation command is received within a time period indicated by the received timeout value. For example, after sending the read command to the MC 124, the processor core 113 waits 640 milliseconds for a corresponding response from the MC 124. If the processor core 113 does not receive the corresponding response from the MC 124 within 640 milliseconds, the processor core 113 determines that the MC 124 will not issue a response and a system hang has occurred in the computing system 100.

FIG. 5 illustrates a flowchart showing a method 500 for dynamically updating timeout values according to one embodiment herein. FIG. 5 will be described using FIGS. 1 and 2.

At block 501, an initiator sends a command to a destination. For example, the processor core 103 sends a read command to the MC 124 to read data from the MC 124, as shown in FIG. 1.

After sending the command to the destination, at block 502, the initiator starts to wait for a response to the command using a previously received timeout value. For example, the processor core 103 may have previously received a timeout value 640 milliseconds from the LTE 111. Thus, the processor core 103 starts to wait for 640 milliseconds before the processor core 103 indicates that a timeout has occurred.

During the waiting period, at block 503, the LTE detects data congestion on the corresponding route used by the initiator for sending the command. For example, during the waiting period of 640 milliseconds, the LTE 111 detects that there is a data congestion on route 4 used by the processor core 103 for sending the read command to the MC 124. In one embodiment, the bus 140 and/or the bus 150 can use the corresponding bus protocols to provide information or alerts (e.g., livelock warning and/or bus hang recovery) to the LTE 111 to indicate that there is data congestion on the bus. Thus, the LTE 111 knows that a route using the congested bus to transmit data is also congested. In another embodiment, the bus 140 and/or the bus 150 can also use the corresponding bus protocols to inform the LTE 111 of the severity of the data congestion on the bus. Thus, the LTE 111 can constantly (or at intervals) determine the congestion levels of the various routes used to transmit commands (and responses thereto) in the computing system.

After the LTE detects that there is data congestion on the route, at block 504, the LTE updates the timeout value for the route with a congestion coefficient. In one embodiment, the LTE 111 can update the timeout value for route 4 as α×640, where α is the congestion coefficient. For example, if the indication from the buses indicates that there is serious data congestion on route 4, the LTE 111 can apply a large α such as 10. On the other hand, if the indication from the buses indicates that there is light data congestion on route 4, the LTE 111 can apply a smaller α such as 1.5. When there is no congestion, the LTE 111 can set a to be one. In one embodiment, the LTE 111 updates the timeout values by using the congestion coefficient in the timeout value mapper 114 as shown in FIG. 2.

At block 505, the LTE provides the updated timeout value to the initiator to replace the previously received timeout value. For example, if the LTE 111 applies a large α (α=10) due to the detection of serious data congestion on route 4, the LTE proactively provides the updated timeout value, i.e., 6400 milliseconds, to the processor core 103. Thus, the processor core 103 will make a timeout determination after waiting for 6400 milliseconds, instead of waiting for 640 milliseconds as indicated in the previously received timeout value.

FIG. 5 shows only one embodiment herein. In another embodiment, the LTE can update the timeout values for other representative routes. In another embodiment, the LTE can update the timeout values for multiple routes by using multiple different congestion coefficients.

FIG. 6 illustrates a flowchart showing a method 600 for updating timeout values according to another embodiment herein. FIG. 6 will be described using FIGS. 1 and 2.

At block 601, the LTE detects that a memory has been moved to another location. For example, the hypervisor of the computing system 100 can notify the LTE 111 that the memory including memory addresses from 100 GB to 110 GB is moved to another physical location, e.g., the memory addresses previously assign to MC 124 as shown in FIG. 1 are assigned to a different component or destination either in the same node or in a different node.

After the LTE detects that a memory has been moved to another location and assigned to a new destination, at block 602, the LTE updates the timeout value for the corresponding route based on the new location of the memory. For example, the LTE 111 determines that the memory including memory addresses from 100 GB to 110 GB is corresponding to route 4 and updates the timeout value for route 4 based on the new location of the memory. For example, if the memory previously assigned to MC 124 is moved from node 121 to node 101 and is assigned to a new destination MC 104 on node 101, route 4 between the new destination MC 104 and the processor core 103 is shorter after the moving. Thus, the LTE 111 can determine that the proper timeout value for the current route 4 should be smaller that the previous value 640 milliseconds, e.g., the proper timeout value for the current route 4 is 320 milliseconds. In one embodiment, at block 602, the LTE can opportunistically use idle cycles on the representative routes to measure the new point-to-point delays and update the timeout values in the timeout value mapper 114 as shown in FIG. 2. For example, the LTE 111 can opportunistically use idle cycles to measure the new point-to-point delays between the new destination MC 104 and the processor core 103. Also, the LTE 111 can update and store the updated timeout value for route 4, e.g., 320 milliseconds, in the timeout value mapper 114. Moreover, the LTE 111 can update the destination for route 4 in column 204 of the timeout value mapper 114. For example, the new destination for route 4 is MC 104 on node 101.

At block 603, the LTE provides the updated timeout value to an initiator upon request. For example, after the memory previously assigned to MC 124 is moved from node 121 to node 101, the LTE 111 receives a request from the processor core 103. The request indicates that the processor core 113 needs to access memory addresses from 100 GB to 110 GB to read data and needs a timeout value for the read operation. The LTE 111 checks the memory address range (column 203) in the timeout value mapper 114 and provides the updated timeout value for route 4, e.g., 320 milliseconds, to the processor core 103.

FIG. 6 shows only one embodiment herein. In another embodiment, the LTE can update the timeout values for other representative routes. In another embodiment, the LTE can update the timeout values for multiple routes if multiple memories are moved to different locations.

In one embodiment, the method 500 in FIG. 5 and the method 600 in FIG. 6 can be used together for one or more routes. For example, after the MC 124 is moved from node 121 to node 101, the LTE 111 can update the timeout value for route 4 according to the method 600 in FIG. 6. After the timeout value for route 4 is updated according to the method 600 in FIG. 6, the LTE 111 detects that there is a data congestion on route 4, the LTE 111 can further update the timeout value for route 4 according to the method 500 in FIG. 5, as understood by an ordinary person in the art.

While the foregoing is directed to embodiments of the present invention, other and further embodiments of the invention may be devised without departing from the basic scope thereof, and the scope thereof is determined by the claims that follow.

What is claimed is:

1. An integrated circuit, comprising:
   an initiator configured to send commands to a plurality of destinations; and
   a timer engine configured to:
      for the initiator, measure a respective time delay for each of a plurality of routes between the initiator and the plurality of destinations, wherein the respective time delay indicates a time period from when the initiator sends a command to one of the plurality of destinations to when the initiator receives a corresponding response;
      for each of the plurality of routes, determine a respective timeout value based on the measured respective time delay for the route;
      for each of the plurality of routes, determine a unique memory mapped address identifying the route; and
   wherein the initiator is further configured to:
      upon determining to send a command to one of the plurality of destinations, send a request to the timer engine for a timeout value, wherein the request includes a memory address for an operation;
      receive the requested timeout value from the timer engine; and
      after sending the command to the destination, determine whether a response to the command is received within a time period indicated by the received timeout value.

2. The integrated circuit of claim 1, wherein at least one of the plurality of destinations is integrated on a different integrated circuit from the initiator.

3. The integrated circuit of claim 1, wherein at least one of the plurality of routes represents a group of routes that use a same timeout value.

4. The integrated circuit of claim 1, upon detecting data congestion on one of the plurality of routes, the timer engine is further configured to update the timeout value for the route.

5. The integrated circuit of claim 4, wherein the timer engine is further configured to update the timeout value for the route by applying a congestion coefficient to the timeout value for the route.

6. The integrated circuit of claim 1, upon detecting that a memory is moved to a new location and assigned to a new destination, the timer engine is further configured to update the timeout value for the route between the initiator and the new destination.

7. The integrated circuit of claim 6, wherein the timer engine is further configured to update the timeout value for the route by using idle cycles to measure the time delay between the initiator and the new destination.

8. A computing system, comprising:
   an initiator configured to send commands;
   a plurality of destinations configured to respond to the commands sent by the initiator; wherein the initiator is coupled to the plurality of destinations through one or more buses; and
   a timer engine configured to:
      for the initiator, measure a respective time delay for each of a plurality of routes between the initiator and the plurality of destinations, wherein the respective time delay indicates a time period from when the initiator sends a command to one of the plurality of destinations to when the initiator receives a corresponding response;
      for each of the plurality of routes, determine a respective timeout value based on the measured respective time delay for the route;
      for each of the plurality of routes, determine a unique memory mapped address identifying the route; and
   wherein the initiator is further configured to:
      upon determining to send a command to one of the plurality of destinations, send a request to the timer engine for a timeout value, wherein the request includes a memory address for an operation;
      receive the requested timeout value from the timer engine; and
      after sending the command to the destination, determine whether a response to the command is received within a time period indicated by the received timeout value.

9. The computing system of claim 8, wherein at least one of the plurality of destinations is integrated on a different integrated circuit from the initiator.

10. The computing system of claim 8, wherein at least one of the plurality of routes represents a group of routes that use a same timeout value.

11. The computing system of claim 8, upon detecting data congestion on one of the plurality of routes, the timer engine is further configured to update the timeout value for the route.

12. The computing system of claim 11, wherein the timer engine is further configured to update the timeout value for the route by applying a congestion coefficient to the timeout value for the route.

13. The computing system of claim 8, upon detecting that a memory is moved to a new location and assigned to a new destination, the timer engine is further configured to update the timeout value for the route between the initiator and the new destination.

14. The computing system of claim 13, wherein the timer engine is further configured to update the timeout value for the route by using idle cycles to measure the time delay between the initiator and the new destination.

15. A method, comprising:
   measuring, by a timer engine, a respective time delay for each of a plurality of routes between an initiator and a plurality of destinations, wherein the respective time delay indicates a time period from when the initiator sends a command to one of the plurality of destinations to when the initiator receives a corresponding response;

for each of the plurality of routes, determining a respective timeout value based on the measured respective time delay for the route;

for each of the plurality of routes, determining a unique memory mapped address identifying the route;

upon determining to send a command to one of the plurality of destinations, sending, by the initiator, a request to the timer engine for a timeout value, wherein the request includes a memory address for an operation;

receiving the requested timeout value from the timer engine; and after sending the command to the destination, determining whether a response to the command is received within a time period indicated by the received timeout value.

16. The method of claim 15, wherein at least one of the plurality of routes represents a group of routes that use a same timeout value.

17. The method of claim 15, further comprising:

upon detecting data congestion on one of the plurality of routes, updating the timeout value for the route by the timer engine.

18. The method of claim 17, further comprising:

updating the timeout value for the route by applying a congestion coefficient to the timeout value for the route.

19. The method of claim 15, further comprising:

upon detecting that a memory is moved to a new location and assigned to a new destination, updating the timeout value for the route between the initiator and the new destination by the timer engine.

20. The method of claim 19, further comprising:

updating the timeout value for the route by using idle cycles to measure the time delay between the initiator and the new destination.

* * * * *